UNITED STATES PATENT OFFICE.

CHARLES A. SHANK, OF PHILADELPHIA, PENNSYLVANIA, ASSIGNOR OF ONE-HALF TO JOHN W. SHANK, OF CENTRAL CITY, NEBRASKA.

ARTIFICIAL-STONE COMPOSITION.

SPECIFICATION forming part of Letters Patent No. 388,726, dated August 28, 1888.

Application filed June 14, 1888. Serial No. 277,100. (No specimens.)

*To all whom it may concern:*

Be it known that I, CHARLES A. SHANK, a citizen of the United States, and a resident of Philadelphia, Pennsylvania, have invented certain Improvements in Artificial-Stone Compositions, of which the following is a specification.

My invention consists of a composition for the manufacture of bricks, tiles, &c., the object of my invention being to form a compound in which neither lime nor cement is used as a base, but in which it is not necessary to bake the compound.

The main ingredients of the compound are rock-salt, muriatic acid, and sal-ammoniac, which constitutes a chemical mixture serving as a binder for the material used as the body of the compound. This chemical binder I mix with any body material, such as clay, sand, loam, coal-ashes, refuse of iron-foundries, refuse of burned bricks, or any earthy material, used either separately or together, or with small or crushed stones, as circumstances require. The rock-salt, muriatic acid, and sal-ammoniac, when mixed, as described hereinafter, with the body material, cause chemical action and the evolution of a gas, and after the latter has escaped the resultant mass is perfectly hard and dry and fire and water proof.

The ingredients are mixed in about the following proportions: With one hundred pounds of rock-salt and ten pounds of sal-ammoniac I mix enough water—say ten gallons—to dissolve the same. After the rock-salt and sal-ammoniac are dissolved I add five pounds of muriatic acid, and I then add one hundred gallons of water and enough of the clay, sand, loam, coal-ashes, &c., either singly or in combination, to form a thick paste similar to that used in forming clay bricks. The whole is then molded into the required form or spread on any prepared pavement bed when used for surfacing sidewalks or roadways.

In about forty-eight hours the mass becomes sufficiently dry to handle or use. The mixture as it dries evolves a gas, and when this evolution of gas ceases the material is left in a perfectly hard state without the necessity of baking or burning.

In preparing street pavements or walks the clay, loam, ashes, &c., forming the foundation of the street or walk can be mixed with the chemical binding composition in the proportions described with satisfactory results, and this can also be done where cellars or vaults are to be lined or coated.

I have found by experiment that material made in accordance with my invention is perfectly water-proof as well as fire-proof, and by dispensing with the use of both lime and cement I make a very cheap compound, and one that can be used for many purposes where lime and cement are not available.

When the compound is to be colored, I can use any coloring-matter; but I prefer, in most cases, to use coal-tar in different proportions, depending upon the shade required.

I claim as my invention—

1. The within-described compound of rock-salt, muriatic acid, and sal-ammoniac as a binder for an artificial-stone composition.

2. A compound in which a body, such as clay, sand, loam, &c., is mixed with a chemical binder composed of rock-salt, sal-ammoniac, and muriatic acid, substantially as described.

3. A compound of rock-salt, muriatic acid, and sal-ammoniac, mixed with a body material and with coal-tar, substantially in the manner and proportions set forth.

In testimony whereof I have signed my name to this specification in the presence of two subscribing witnesses.

CHARLES A. SHANK.

Witnesses:
WILLIAM D. CONNER,
HENRY HOWSON.